May 24, 1966    G. H. BEALL    3,252,811
GLASS-CERAMIC BODIES AND METHOD OF MAKING THEM
Filed Dec. 11, 1963    2 Sheets-Sheet 1

INVENTOR.
George H. Beall
BY Clarence R. Patty
ATTORNEY

May 24, 1966   G. H. BEALL   3,252,811
GLASS-CERAMIC BODIES AND METHOD OF MAKING THEM
Filed Dec. 11, 1963   2 Sheets-Sheet 2

INVENTOR.
George H. Beall
BY
ATTORNEY

United States Patent Office 3,252,811
Patented May 24, 1966

3,252,811
GLASS-CERAMIC BODIES AND METHOD OF MAKING THEM
George H. Beall, Corning, N.Y., assignor to Corning Glass Works, Corning, N.Y., a corporation of New York
Filed Dec. 11, 1963, Ser. No. 329,623
9 Claims. (Cl. 106—39)

This invention relates to the manufacture of transparent glass-ceramic bodies which exhibit very high strength and excellent resistance to thermal shock.

The quest for a semicrystalline or glass-ceramic article, i.e., an article composed of fine-grained crystals substantially homogeneously dispersed in a glassy matrix and developed in situ in a glass body, has its origin at least as long ago as Reaumur's classic experiments with porcelains. From the standpoint of practical success, however, the manufacture of semicrystalline articles dates back less than ten years. United States Patent No. 2,920,971, granted to Stanley D. Stookey, opened a new dimension in the field of glass and explained the theoretical concepts and the mechanical processes necessary to convert a glass body into a glass-ceramic or semicrystalline body. This patent discussed the basic mechanism permitting the production of such bodies, i.e., the controlled heat treatment of particular glass compositions to cause the precipitation and growth of crystal phases in situ. The fundamental theory of the function of a nucleating agent in the development of crystal phases is postulated therein with special emphasis upon the effectiveness of titania as a nucleating agent. In brief, the manufacture of glass-ceramic articles is disclosed as comprising the steps of melting a glass-forming batch, thereafter cooling the melt and forming a glass article therefrom, and subsequently heat treating this glass article within a particular temperature range for the necessary period of time to develop the desired internal crystallization. Titania is hypothesized as functioning as a nucleating agent. Thus, it is theorized that at the beginning of the heat treating step submicroscopic particles are first developed in the glass body and these particles form points upon which crystal phases grow as the heat treatment is continued. The effectiveness of $TiO_2$ as a nucleating agent for glass compositions is substantially universal, as evidenced by the more than one hundred examples described in that patent. Products made from $TiO_2$-nucleated glass compositions have included dinnerware, culinary ware, and radomes for missiles and space probes. However, it will be appreciated that although these products have proved very satisfactory for these services, research has been constant to develop semicrystalline bodies which exhibit even better properties for a specific application.

One particular property which has been sought is that of transparency in the body. The conventional semicrystalline articles of commerce are opaque. It has been realized that a transparent body which would have the high mechanical strength, low coefficient of thermal expansion, and other desirable properties of a glass-ceramic would be particularly useful in such applications as automobile and aircraft windshields, cooking utensils, oven windows, and the like.

Therefore, the principal object of this invention is to provide a transparent semicrystalline material which possesses very high mechanical strength and excellent resistance to thermal shock.

Another object of this invention is to provide a method of making semicrystalline materials which are transparent and exhibit high mechanical strengths and excellent resistance to thermal shock.

In order to make the description of and method of producing the article of this invention more clear, the following figures are included wherein.

Figure 1:
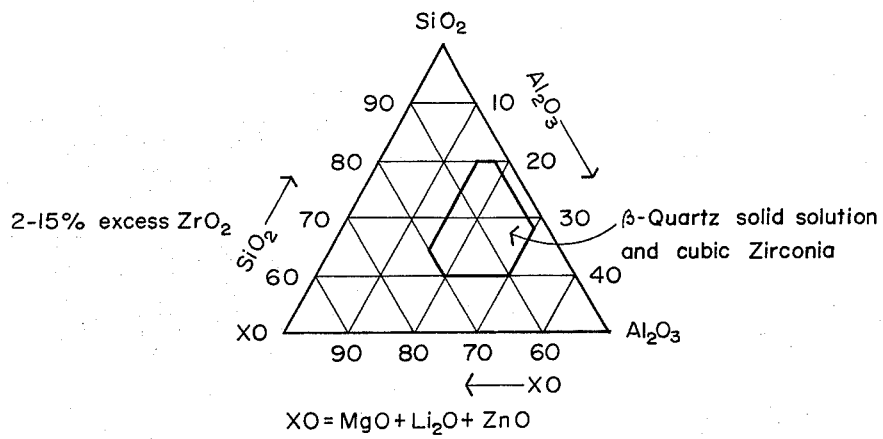
FIGURE 1 represents a ternary diagram setting forth the basic compositions contemplated and the crystal phases developed in the product of the invention.

I have discovered that the above objects can be achieved in a semicrystalline body derived from a particularly narrow range of base glass compositions into which zirconia is incorporated as the nucleating agent. This group of base glass compositions consists essentially, in weight percent on the oxide basis, of 60–80% $SiO_2$, 15–30% $Al_2O_3$, and 2–20% XO, wherein XO represents the total of 0–15% MgO+0–4% $Li_2O$+0–12% ZnO, at least 2% MgO being required where neither $Li_2O$ nor ZnO is present and at least 2% $Li_2O$+at least 4% ZnO being required where MgO is present in an amount less than 2%. $ZrO_2$ is added to the glass-forming batch in an amount of 2–15%, based upon the total weight of the base glass composition.

The basic concept of the effectiveness of $ZrO_2$ as a nucleating agent in the production of glass-ceramic bodies is disclosed by Dr. Friedrich Meyer in the German Patent No. 1,099,135. However, the peculiarly advantageous properties inherent insemicrystalline articles made from the specific base glass compositions of this invention are not cited therein nor are examples recorded falling within this special range of base glass compositions. My invention provides a semicrystalline body which is transparent, has exceptional mechanical strength, and excellent resistance to thermal shock. Such a body is produced from a severely limited range of base glass compositions which is, of course, literally within the broad scope of the claims of the patent to Meyer, but which is in reality outside of the formal disclosure thereof as exemplified by the examples set forth therein. And it is this unique range of base compositions, only incidentally encompassed in Meyer's disclosure of the apparent universal effectiveness of $ZrO_2$ as a nucleating agent, which I have discovered to yield transparent semicrystalline articles of superior physical properties upon proper heat treatment.

United States Patent No. 3,006,775 issued to Franklin P. H. Chen also discusses the utility of $ZrO_2$ in glass-cermic compositions with particular emphasis on glasses in the $Li_2O \cdot Al_2O_3 \cdot SiO_2$ field, defining it as a "fluxing agent" and stating that these glass compositions need no nucleating agent to induce the nucleation or growth of crystals during the heat treatment of he glass. However, no matter how the function of the zirconia is defined, the compositions of my invention are not disclosed. Also, there is no description of a transparent semicrystalline body possessing high mechanical strength and a low coefficient of thermal expansion.

The hexagonal trapezohedral modification of $SiO_2$, viz., β-quartz, stable from 573°–870° C., is known to possess a slightly negative coefficient of thermal expansion. In addition, this crystal phase displays very low birefringence (optical anisotropy). These two characteristics led to research into the extent of solid solution which could be induced in this phase for the purpose of producing low expansion and light transmitting semicrystalline materials. Complete solid solution exists between pure β-quartz and β-eucryptite, $Li_2O \cdot Al_2O_3 \cdot 2SiO_2$, the only other mineral known to have a negative coefficient of thermal expansion. Until recently, this series was believed to include all compositions capable of forming minerals isostructural with β-quartz. These solid solutions have been termed "stuffed derivatives" of β-quartz (Buerger, M. J., The Stuffed Derivatives of the Silica Structures, Am. Mineral., 39, 600–14 (1954)), because they may be thought of as resulting from the replacement of some of the tetrahedral silicon ions in β-quartz by aluminum, the charge deficiency being made up by "stuffing" the interstitial vacancies in the double helicoid silica structure with lithium ions. It has recently been shown (Schreyer, W. and Echairer, J. F., Metastable Solid Solutions With Quartz-Type Structures on the Join $SiO_2$—$MgAl_2O_4$, Geophys. Lab No. 1357 (1961)) that a series of metastable β-quartz solid solutions can also be formed along the join $$SiO_2—MgAl_2O_4$$

In this case, aluminum for silicon substitution is accompanied by magnesium stuffing of β-quartz interstitial vacancies. Only one $Mg^{2+}$ ion is required per $2Al^{3+}$ for $2Si^{4+}$ substitutions in this instance whereas $2Li^+$ ions are required in the β-eucryptite case. This magnesium series is referred to herein as the "mu-cordierite" series after the original name given to a then unknown metastable phase synthesized at the cordierite stoichiometry by Karkhanavala and Hummel (The Cordierite-Spodumene Join, J. Am. Ceram. Soc., 36, 393–7 (1953)). This mineral was in fact a stuffed β-quartz although these authors erroneously reported it to be isostructural with the lithium mineral spodumene. Schreyer and Schairer, in the article noted above, have shown that the X-ray diffraction peaks reported by Karkhanavala and Hummel are analogous to those of high quartz (β-quartz), which though somewhat similar to those of spodumene, are nevertheless distinct.

In view of this work, research was initiated to determine if a semicrystalline body could be developed wherein "stuffed" β-quartz would form the crystal phase such that the body would be essentially transparent with a very low coefficient of thermal expansion. These two physical properties plus the additional characteristic of high mechanical strength were observed in a very limited range of stuffed β-quartz solid solutions where the stuffing ions are magnesium, lithium, and zinc. Magnesium may be used alone but a combination of lithium and zinc must be utilized where magnesium is absent. Thus, I have discovered that a compositional area of transparent β-quartz glass-ceramics occurs within the quinary system $SiO_2$—$Al_2O_3$—MgO—$Li_2O$—ZnO. In general, β-quartz solid solution compositions lying between about the 60 and 80 weight percent $SiO_2$ levels with less than about 15 weight percent $ZnAl_2O_4$ can be made transparent providing there is enough zirconia present to nucleate a very fine-grained body. These glass ceramics are essentially colorless and free of haze if the heat treatment and zirconia level are proper. Grain size increases with decreasing $ZrO_2$ level and with prolonged heat treatment in excess of the minimum required for the development of high crystallinity. Such increase in crystal size frequently produce haze. The transparency is primarily due to the very low birefringence in the β-quartz solid solutions along the $SiO_2$—$MgAl_2O_4$ join. Birefringence is minimized at about 70 weight percent $SiO_2$ (Schreyer and Schairer article noted above), precisely the center of the glass-ceramic transparency zone along this join. The necessity of developing crystals of very small size is very real and, if the crystals are sufficiently small, transparency can result in spite of birefringence or refractive index mismatch between various phases. Hence, transparency in ultra fine-grained (about 500 A. crystal size) β-eucryptite quartzes is possible despite some birefringence. Cubic $ZrO_2$, in spite of a refractive index much higher than β-quartz solid solutions, does not affect transparency because of its minute crystal size (of the order of 100 A.). Pure magnesian β-quartz crystals, however, averaging just less than 1 micron in diameter according to electron micrographs must depend largely upon low birefringence for transparency. The maximum grain size for transparency in β-quartz-containing bodies appears to be about 10 microns.

The transparent semicrystalline ceramic articles of my invention are produced by melting a glass-forming batch consisting essentially, on the oxide basis in weight percent, of 60–80% $SiO_2$ 15–30% $Al_2O_3$, and 2–20% XO, wherein XO represents the total amount of 0–15% MgO+0–4% $Li_2O$+0–12% ZnO, at least 2% MgO being required where neither $Li_2O$ nor ZnO is present and at least 2% $Li_2O$+4% ZnO being required where MgO is present in an amount less than 2%, to which is added 2–15% $ZrO_2$, based upon the total weight of the base glass composition, as nucleating agent, simultaneously cooling and shaping the melt into a glass body of the desired configuration, this cooling being continued to at least below the transformation point, i.e., the temperature at which the liquid melt is deemed to have been transformed into an amorphous or glassy solid, said temperature being generally in the vicinity of the annealing point of the glass (about 700° C. to 800° C. for glasses of this invention); thereafter heat treating the glass body by exposing it to a temperature of at least about 750° C., but not over about 1150° C., maintaining it within this temperature range for a sufficient length of time to assure the desired development of crystallization while retaining transparency, and finally cooling the body to room temperature. This time may vary from a few minutes, say 15 minutes, at 1150° C. to 6–24 hours and frequently longer at the lower end of the range. This time-temperature relationship is relatively flexible and longer times may usually be utilized at any particular temperature but there is generally no practical advantage in so doing. However, excessive dwell periods at the highest extreme of the temperature range, i.e., periods of 6–12 hours should be avoided as the body loses its complete transparency and becomes translucent or even opaque if the heating is continued for a sufficient length of time. At temperatures less than about 750° C., crystallization is sparse and slow forming, if present at all. At temperatures above about 1150° C., the body is translucent or opaque rather than transparent and there is the danger of the softening and melting of the semicrystalline body. Finally, if the rate of heating the glass body is relatively slow and the final temperature near the upper extreme of the heat treating range, no dwell time at a specific temperature is necessary. However, I have learned that a two-step heat treating schedule is advantageous in yielding articles of good transparency. Thus, the glass body is first heated to a temperature in the lower end of the heat treating range, heated thereat for a certain period, and then raised to a higher temperature for a certain dwell period. I have learned that a two-step heat treatment comprising a holding period of about 2–6 hours at temperatures ranging from about 780° C.–820° C. followed by a second dwell period of about 2–6 hours at temperatures ranging from about 880° C–920° C. yields very satisfactorily crystallized bodies. In some instances, I have found that very long dwell periods, say up to 20 hours, in the lower or nucleating temperature range are advantageous in producing very fine-grained crystals when the temperature is raised to the preferred crystallization range. The longer holding period at the lower temperatures is believed to furnish more crystal sites upon which the desired crystals may grow.

An indication of the attainment of the desired crystallization is evidenced by the sharp rise in the temperature of the strain point as the crystallization is developed in situ in the base glass. Thus, the glass bodies of the present compositions exhibit strain points in the neighborhood of 600–650° C. whereas the semicrystalline bodies of like compositions have strain points of at least about 750° C. and are generally higher. Therefore, the glass-ceramic articles of this invention are characterized by having strain points of at least 750° C. (The Strain Point designates the temperature at which the viscosity of a glass is $10^{14.5}$ poises and is equivalent to the lower limit of the annealing interval determined according to ASTM: C336-54T.)

The sequence of nucleation and crystallization has been determined to be as follows: Typically, cubic zirconia is the first phase to crystallize upon raising the temperature of a $\beta$-quartz-zirconia glass, forming countless tiny nuclei, which judging from X-ray diffraction line broadening, are less than 100 A. in diameter. If there is insufficient $ZrO_2$ in the glass, $\beta$-quartz precedes cubic $ZrO_2$ in crystallizing from the glass, this crystallization beginning at the surface thereof. This can be remedied by adding more zirconia to the batch which lowers the temperature of zirconia separation.

Continued heat treatment after precipitation of the $ZrO_2$ results in the formation of $\beta$-quartz solid solution crystals upon the $ZrO_2$ nuclei. The first trace of $\beta$-quartz to form is invariably more highly stuffed (lowest in $SiO_2$) than the $\beta$-quartz which results from further crystallization. A series of X-ray diffraction patterns of several compositions during the crystallization range of $\beta$-quartz showed a continuous decrease in $d$-spacing of the X-ray diffraction peaks, indicating the decrease in unit cell volume which accompanies rising $SiO_2$ content. As the $\beta$-quartz crystallization is completed, a metastable equilibrium condition is reached with the microcrystalline body made up almost entirely of $\beta$-quartz solid solution and small amounts of highly siliceous residual glass and cubic zirconia.

In the following examples set out in Table I, the batch ingredients were ball milled together prior to melting in order to obtain better glass homogeneity and more efficient melting. Melting was carried out in open crucibles at temperatures ranging from 1600°–1800° C., the higher temperatures being employed with those compositions high in silica and zirconia. Each batch was melted at least four hours in open crucibles, the low temperature melts being stirred while the high temperature ones were not. Each melt was poured into a mold (and, in some instances, cane was also drawn) and then transferred to an annealer operating at 700° C. wherein the bodies were cooled as a glass to room temperature. These glass bodies were cooled to room temperature prior to heat treatment to permit a visual examination of the glass quality and the possible incidence of devitrification. Such crystallization which occurs as the melt is being cooled precludes the development of a uniformly fine-grained semicrystalline body upon heat treatment. The glass shapes were then heat treated in accordance with the above-described two-step process. Thus, the glass bodies were placed in a furnace and heated at about 5° C./minute to the first level of crystallization, as recorded in Table II, held thereat for a predetermined time, after which the furnace temperature was raised at about 5° C./minute to the second level of heat treatment and held thereat for a second period of time. Finally, the semicrystalline shapes were cooled to room temperature by removing them from the furnace and cooling in air.

It must be appreciated that the heating rate applied to the glass articles of this invention is determined by the resistance to thermal shock possessed by the glass, the size and configuration of the glass article, and the speed with which crystallization develops within the glass during heat treatment. The glasses of this invention have a relatively low coefficient of thermal expansion and when present in shapes of small cross-section can be heated at rates much faster than 5° C./minute without fear of cracking or breakage. However, when the glass article is heated above the transformation range, softening of the body and consequent deformation may occur. But, the softening point and, therefore, the deformation point of the glass-ceramic body is considerably higher than that of the base glass. Hence, where the rates of heating the glass article above the transformation range are balanced against the rate at which crystals are developed, a crystalline structure will be produced which will support the body against deformation. Too rapid heating will preclude the development of sufficient crystallization to support the body and slumping will take place. In substantially all instances, crystallization proceeds more rapidly as the temperature of the body approaches the solidus temperature (temperature at which first melting occurs for stable crystalline aggregate of same bulk composition as the glass). Hence, in commercial practice, the articles are heat treated at temperatures considerably higher than that where crystallization first appears. However, although more rapid heating rates can be satisfactorily employed, particularly when a relatively long holding period at the lower end of the crystallization range is utilized, I prefer to raise the temperature at rates not over about 5° C./minute in order to obtain dense crystallization with little, if any, deformation as the body is heated above the softening point of the glass. More rapid heating rates are, of course, practicable where some physical support, such as various forms of kiln furniture, is provided.

As the linear coefficients of thermal expansion of the semicrystalline bodies of this invention are very low, the rate of cooling to room temperature after heat treatment is substantially unlimited. Thus, the articles may be removed directly from the furnace and allowed to cool in air or, frequently, the heat to the furnace is merely cut off and the furnace allowed to cool with the articles retained therein.

The ranges of compositions defined above are critical to the invention. Where the components of the base glass are present in amounts outside of those set forth, semicrystalline ceramic bodies will be produced which, though useful in many applications, will not have the desirable transparency of those resulting from the present invention.

At least 2% $ZrO_2$ must be added to the batch to initiate nucleation in the body and thereby yield a uniformly fine-grained crystalline body. Further, if there is insufficient $ZrO_2$ present, $\beta$-quartz is likely to precipitate before the zirconia nuclei. This crystallization begins at the surface, causing a textured surface and/or surface wrinkling. More than 15% $ZrO_2$ causes the body to lose its transparency due to the development of $ZrO_2$ opalization which occurs when the melt is quenched to a glass.

Table I illustrates glass-forming batches, expressed in weight percent on the oxide basis, exclusive of minor impurities which may be present in the batch materials, which, when treated in accordance with the preferred embodiment of the invention, yield transparent glass-ceramic articles of exceptional strength and resistance to thermal shock. The batch ingredients may consist of any materials, either oxides or other compounds, which, on being fused together in a melt are transformed to the desired oxide compositions in proper proportions. The amount of $ZrO_2$ is stated separately from the composition of the base glass, being considered as present in excess thereof. Table I also records the temperature utilized in melting the batch.

Table II sets forth the heat treating schedules, visual descriptions of the glass-ceramic bodies, crystal phases present as determined by X-ray diffraction analyses, and some coefficient of thermal expansion ($\times 10^{-7}/°$ C.) measurements. These measurements of expansion coefficients were obtained in the conventional manner. Modulus of rupture measurements, conducted in the conventional manner upon samples which had been abraded with 30 grit silicon carbide paper, indicated the strength of these glass-ceramics to be about twice that of ordinary abraded annealed glass, ranging from about 10,000 to 15,000 p.s.i.

If desired, a fining agent such as $As_2O_5$ may be added to the batch although these melts are of low viscosity. In normal practice, only about 0.3–2.0% by weight of a fining agent is added and, as the amount remaining in the glass after the batch has been melted is too small to have any substantial effect on the fundamental properties of the glass, such constituent was not included in Table I. In the present glasses, a yellowish cast emerges with the crystallization if a quantity in excess of 1% by weight of $As_2O_5$ is used as the fining agent. To avoid this condition, therefore, the amount of fining agent must be less than 1% by weight when $As_2O_5$ is utilized therefor.

TABLE I

|  | 1 (CPC) | 2 (CPD) | 3 (CQM) | 4 (CQO) | 5 (CQQ) |
|---|---|---|---|---|---|
| $SiO_2$ | 75 | 70 | 65 | 73 | 70 |
| $Al_2O_3$ | 18 | 22 | 22 | 20 | 22 |
| MgO | 3 | 6 | 6 | 5 | 5 |
| ZnO |  |  | 6 |  |  |
| $Li_2O$ | 4 | 2 |  | 2 | 3 |
| $ZrO_2$ | 4 | 5 | 8 | 5 | 4 |
| Melting Temp., °C | 1,650 | 1,600 | 1,650 | 1,650 | 1,650 |

|  | 6 (CRL) | 7 (CUZ) | 8 (CWR) | 9 (CZC) | 10 (DBC) |
|---|---|---|---|---|---|
| $SiO_2$ | 70 | 70.5 | 70 | 74 | 70 |
| $Al_2O_3$ | 21 | 21 | 22 | 19 | 23 |
| MgO | 3 | 4 | 6 | 5 | 3 |
| ZnO | 3 | 2 |  |  | 2 |
| $Li_2O$ | 3 | 2.5 | 2 | 2 | 2 |
| $ZrO_2$ | 4 | 4 | 4 | 4 | 4 |
| Melting Temp., °C | 1,650 | 1,650 | 1,600 | 1,600 | 1,600 |

|  | 11 (DBG) | 12 (CMX) | 13 (AYQ) | 14 (CPF) | 15 (ATZ) |
|---|---|---|---|---|---|
| $SiO_2$ | 70 | 65 | 70 | 65 | 70 |
| $Al_2O_3$ | 24 | 25 | 20 | 24 | 18 |
| MgO | 4 | 10 | 3 | 8 |  |
| ZnO |  |  | 5 | 3 | 10 |
| $Li_2O$ | 2 |  | 2 |  | 2 |
| $ZrO_2$ | 4.5 | 10 | 5 | 9 | 6 |
| Melting Temp., °C | 1,600 | 1,800 | 1,650 | 1,650 | 1,800 |

Table II clearly establishes the faculty of the compositions of this invention when heat treated in the proper manner to produce semicrystalline ceramic bodies which are transparent, strong, and resistant to thermal shock. Laboratory examinations have determined that the crystal content of these articles can vary to some extent depending upon the extent to which the batch ingredients are adaptable to the formation of crystal phases. Nevertheless, it is believed that the crystal content of the body is at least 50% by volume as measured by electron micrograph techniques, and is generally in excess of 75%, the higher crystal contents normally being preferred. The crystals, themselves, are relatively uniformly fine-grained, substantially all being finer than 10 microns and randomly dispersed in the glassy matrix. This criticality of fine grain size with respect to transparency has been explained in detail above. The single-step heat treatments of Examples 2 and 12 are included to demonstrate the effectiveness of such although it is believed that the two-step treatment yields a more uniformly crystalline body.

The three-step heat treating schedule recorded in this table with respect to Example 9 has given products of exceptional clarity with this and other compositions. Thus, the glass is first heated in the lower or nucleating range after which the temperature is raised only somewhat so that $\beta$-quartz is crystallized upon the nuclei of cubic zirconia at a lower temperature and, therefore, at a slower rate. This slower growth of $\beta$-quartz promotes the development of an extremely fine-grained $\beta$-quartz body in that more of the cubic $ZrO_2$ crystal sites will be utilized. The temperature of the body is finally raised to the third temperature level in order to promote the growth of $\beta$-quartz crystals, thereby achieving maximum crystallinity.

FIGURE 1 represents a ternary diagram setting forth the primary crystal phases developed and the composition ranges of the principal constituents included in the prod-

TABLE II

| Example No. | Heat Treat. Schedule | Visual Appearance | Crystal Phases | Exp. Coef. (25°–300° C.) |
|---|---|---|---|---|
| 1 | 780° C.—4 hrs. 825° C.—4 hrs. | Transparent and colorless. | $\beta$-quartz solid solution, cubic $ZrO_2$. | 0 |
| 2 | 830° C.—4 hrs. 800° C.—4 hrs. 880° C.—4 hrs. | Transparent and colorless. Transparent and colorless. | Cubic $ZrO_2$ only. $\beta$-quartz solid solution, cubic $ZrO_2$. | 32 19 |
| 3 | 810° C.—6 hrs. 910° C.—6 hrs. | Transparent and colorless. | $\beta$-quartz solid solution, cubic $ZrO_2$. | 24 |
| 4 | 905° C.—6 hrs. 1,035° C.—6 hrs. | Transparent, slight white cast. | $\beta$-quartz solid solution, cubic $ZrO_2$. | 16 |
| 5 | 810° C.—6 hrs. 865° C.—6 hrs. | Transparent, slight white cast. | $\beta$-quartz solid solution, cubic $ZrO_2$. | 15 |
| 6 | 910° C.—6 hrs. 1,015° C.—6 hrs. | Transparent with slight white cast. | $\beta$-quartz solid solution, cubic $ZrO_2$. | 6 |
| 7 | 770° C.—6 hrs. 830° C.—6 hrs. | Transparent with slight white cast. | $\beta$-quartz solid solution, cubic $ZrO_2$. | 25 −18 |
| 8 | 800° C.—6 hrs. 900° C.—6 hrs. | Transparent and colorless. | $\beta$-quartz solid solution, cubic $ZrO_2$. |  |
| 9 | 810° C.—4 hrs. 900° C.—6 hrs. 800° C.—4 hrs. 840° C.—6 hrs. 920° C.—6 hrs. | Transparent and colorless. Transparent and colorless. | $\beta$-quartz solid solution, cubic $ZrO_2$. $\beta$-quartz solid solution, cubic $ZrO_2$. | 15 15 |
| 10 | 800° C.—4 hrs. 890° C.—6 hrs. | Transparent and colorless. | $\beta$-quartz solid solution, cubic $ZrO_2$. | 11 |
| 11 | 800° C.—4 hrs. 890° C.—6 hrs. | Transparent and colorless. | $\beta$-quartz solid solution, cubic $ZrO_2$. | 16 |
| 12 | 930° C.—6 hrs. 770° C.—2 hrs. 890° C.—6 hrs. | Transparent and colorless. | $\beta$-quartz solid solution, cubic $ZrO_2$. | 7 |
| 13 | 880° C.—4 hrs. 960° C.—4 hrs. | Transparent and colorless. | $\beta$-quartz solid solution, cubic $ZrO_2$, trace of petalite. | 30 |
| 14 | 905° C.—2 hrs. 1065° C.—6 hrs. | Transparent and colorless. | $\beta$-quartz solid solution, cubic $ZrO_2$. | 31 |
| 15 | 810° C.—6 hrs. 850° C.—6 hrs. | Transparent with slight white cast. | $\beta$-quartz solid solution, cubic $ZrO_2$. | −7 | uct of the invention, viz., $SiO_2$, $Al_2O_3$, and XO, where XO designates the amount of $MgO+Li_2O+ZnO$, this amount varying from a minimum of 2% MgO to a maximum combination of these ingredients of 20%. The $ZrO_2$ is considered as being in excess of the base glass composition.

Figure 2:
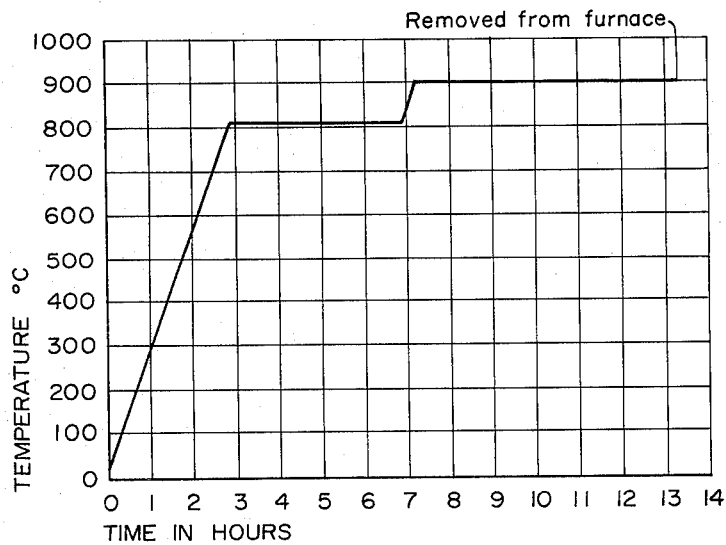
FIGURE 2 represents a time-temperature curve for a specific embodiment of the method of making the product of the invention.

FIGURE 2 illustrates a time-temperature chart for the two-step heat treatment of a preferred composition of the invention, viz., Example 9. Thus, after the batch had been compounded, melted, shaped, and cooled as a glass body to room temperature, this glass body was placed in a furnace and subjected to the following heat treatment: the temperature was raised at 5° C./minute to 810° C., maintained thereat for 4 hours, thereafter the temperature was raised at 5° C./minute to 900° C., maintained thereat for 6 hours, and then the body was removed from the furnace and allowed to cool in the surrounding air.

Figure 3:
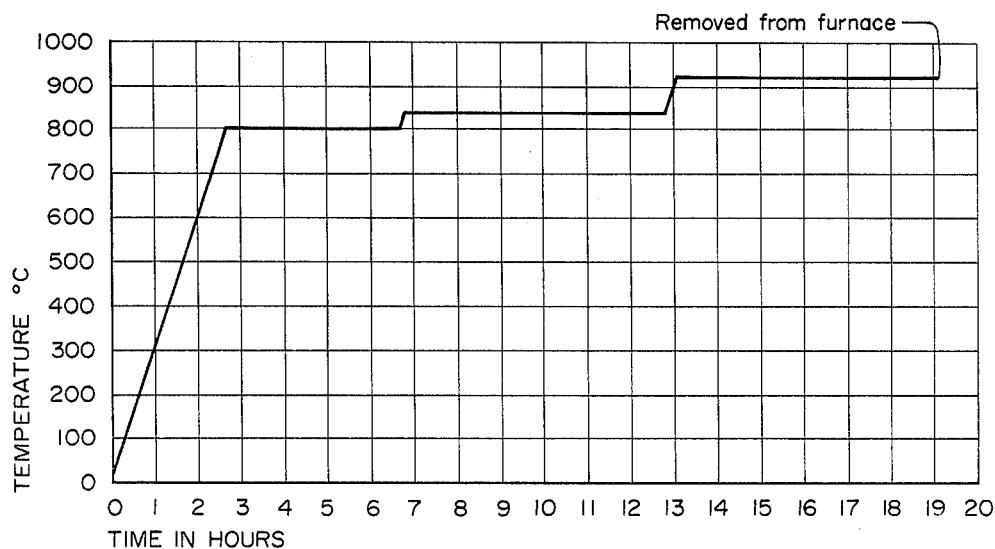
FIGURE 3 represents a time-temperature curve for another specific embodiment of the method of making the product of the invention.

FIGURE 3 sets forth a time-temperature chart for the three-step heat treatment which has produced bodies of exceptional clarity of the composition of Example 9. Thus, after the proper batch had been compounded, melted, shaped, and cooled as a glass body to room temperature, the glass body was placed in a furnace and subjected to the following heat treatment: the temperature was raised at 5° C./minute to 800° C., maintained thereat for 4 hours, subsequently the temperature was raised at 5° C./minute to 840° C., held thereat for 6 hours, thereafter the temperature was raised at 5° C./minute to 920° C., maintained thereat for 6 hours, and then the body was removed from the furnace and allowed to cool in the surrounding air.

I claim:

1. A transparent semicrystalline ceramic body consisting essentially of a multiplicity of fine-grained, randomly-oriented, inorganic crystals substantially uniformly dispersed in a glassy matrix, said crystals being formed by crystallization in situ from a glass body made from a glass-forming batch consisting essentially, by weight on the oxide basis, of 60–80% $SiO_2$, 15–30% $Al_2O_3$, and 2–20% XO, wherein XO represents the total of 0–15% $MgO+0-4\%$ $Li_2O+0-12\%$ ZnO, at least 2% MgO being required when present alone and at least 2% $Li_2O+$at least 4% ZnO being required when MgO is present in an amount less than 2%, to which is added 2–15% $ZrO_2$, based upon the total weight of the base glass composition, said glassy matrix consisting essentially of the uncrystallized portion of the glass remaining after the crystallization of said crystals.

2. A transparent semicrystalline ceramic body according to claim 1 characterized by having a strain point of at least 750° C.

3. A transparent semicrystalline ceramic body according to claim 2 wherein substantially all of said crystals are finer than 10 microns in diameter.

4. A transparent semicrystalline ceramic body according to claim 3 wherein said crystals comprise at least 50% by volume of said body.

5. A transparent semicrystalline ceramic body according to claim 4 wherein said inorganic crystals are composed of β-quartz solid solution and cubic zirconia.

6. The method of making a transparent semicrystalline ceramic body comprising the steps of melting a glass-forming batch consisting essentially, by weight on the oxide basis, of about 60–80% $SiO_2$, 15–30% $Al_2O_3$, and 2–20% XO, wherein XO represents the total of 0–15% $MgO+0-4\%$ $Li_2O+0-12\%$ ZnO, at least 2% MgO being required when present alone and at least 2% $Li_2O+$at least 4% ZnO being required where MgO is present in an amount less than 2%, to which is added 2–15% $ZrO_2$, based upon the total weight of the base glass composition, simultaneously cooling the melt at least below the transformation point of said melt and shaping a body therefrom, thereafter heating said glass body to a temperature of at least about 750° C., but not over about 1150° C., for a time sufficient to develop the desired crystallization in situ, and then cooling said body to room temperature.

7. The method according to claim 6 wherein the time sufficient to develop the desired crystallization ranges from about 15 minutes at the upper extreme of said heat treating range to about 6–24 hours at the lower extreme.

8. The method of making a transparent semicrystalline ceramic body comprising the steps of melting a glass-forming batch consisting essentially, by weight on the oxide basis, of 60–80% $SiO_2$, 15–30% $Al_2O_3$, and 2–20% XO, wherein XO represents the total of 0–15% $MgO+0-4\%$ $Li_2O+0-12\%$ ZnO, at least 2% MgO being required when present alone and at least 2% $Li_2O+$at least 4% ZnO being required when MgO is present in an amount less than 2%, to which is added 2–15% $ZrO_2$, based upon the total weight of the base glass composition, simultaneously cooling the melt at least below the transformation point of said melt and shaping a glass body therefrom, thereafter heating said glass body to a temperature range of about 780°–820° C., maintaining thereat for about 2–6 hours, raising the temperature of the body to about 880°–920° C., maintaining thereat for about 2–6 hours, and then cooling to room temperature.

9. The method of making a transparent semicrystalline ceramic body comprising the steps of melting a glass-forming batch consisting essentially, by weight on the oxide basis, of 74% $SiO_2$, 19% $Al_2O_3$, 5% MgO, and 2% $Li_2O$ to which is added 4% $ZrO_2$, based upon the total weight of the base glass composition, simultaneously cooling the melt at least below the transformation point of said melt and shaping a glass body therefrom, thereafter heating said glass body to 800° C., maintaining thereat for 4 hours, subsequently heating the body to 840° C., maintaining thereat for 6 hours, then heating the body to 920° C., maintaining thereat for 6 hours, and finally cooling to room temperature.

No references cited.

TOBIAS E. LEVOW, *Primary Examiner.*

N. McCARTHY, *Assistant Examiner.*